(12) United States Patent
Trembly

(10) Patent No.: US 9,950,939 B2
(45) Date of Patent: Apr. 24, 2018

(54) TECHNIQUE FOR REMOVAL OF ORGANICS AND DISSOLVED SOLIDS FROM AQUEOUS MEDIAS VIA SUPERCRITICAL TREATMENT

(71) Applicant: Ohio University, Athens, OH (US)

(72) Inventor: Jason Patrick Trembly, Athens, OH (US)

(73) Assignee: Ohio University, Athens, OH (US)

( * ) Notice: Subject to any disclaimer, the term of this patent is extended or adjusted under 35 U.S.C. 154(b) by 541 days.

(21) Appl. No.: 14/373,778

(22) PCT Filed: Jan. 24, 2013

(86) PCT No.: PCT/US2013/022842
§ 371 (c)(1),
(2) Date: Jul. 22, 2014

(87) PCT Pub. No.: WO2013/112654
PCT Pub. Date: Aug. 1, 2013

(65) Prior Publication Data
US 2014/0346114 A1   Nov. 27, 2014

Related U.S. Application Data

(60) Provisional application No. 61/591,436, filed on Jan. 27, 2012.

(51) Int. Cl.
*C02F 9/00* (2006.01)
*B01J 3/00* (2006.01)
(Continued)

(52) U.S. Cl.
CPC ............. *C02F 9/00* (2013.01); *B01J 3/008* (2013.01); *C02F 1/20* (2013.01); *C02F 1/28* (2013.01);
(Continued)

(58) Field of Classification Search
CPC .................................. C02F 9/00; B01J 3/008
See application file for complete search history.

(56) References Cited

U.S. PATENT DOCUMENTS 2,462,499 A * 2/1949 Hoak ...................... B32B 27/00
423/147
3,575,853 A * 4/1971 Gaughan ................ C02F 1/705
210/195.3

(Continued)

FOREIGN PATENT DOCUMENTS

WO   WO-9221622 A1 * 12/1992   ............ C02F 11/086

OTHER PUBLICATIONS

Armellini, F.J., "Phase equilibria and precipitation phenomena of sodium chloride and sodium sulfate in sub- and supercritical water," Thesis (Ph.D.), Massachusetts Insitute of Technology, Dept or Chem Engg., 1993, http://hdl.handle.net/1721.1/12552.*

(Continued)

*Primary Examiner* — Chester T Barry
(74) *Attorney, Agent, or Firm* — Wood Herron & Evans LLP

(57) ABSTRACT

Flow and product waste water from fracturing can be cleaned and reused utilizing a precipitation methodology incorporating, in part, a super critical reactor 30. Initially, the waste water is treated to remove solids, destroy bacteria, and precipitate out certain salts, such as barium, strontium, calcium, magnesium and iron. The waste water then can be passed through a radioactive material adsorption unit 20 to remove radium, as well as other radioactive materials, and then introduced into the super critical reactor 30. The super critical reactor is designed to bring the waste water to super critical conditions at a central portion of the reactor. This causes any dissolve solids, in particular sodium chloride and the like, to precipitate out of solution in the center 42 of the reactor 30 thereby avoiding scale formation on the walls of (Continued)

the reactor. A catalyst can be utilized to promote the breakdown of carbon bonds and promote the water/gas shift reaction. The effluent from the super critical reactor is then cooled and any formed gases separated from the remaining liquid. The remaining liquid can then be introduced back into the environment and the gases can be used to heat the super critical reactor.

12 Claims, 3 Drawing Sheets

(51) Int. Cl.
| | |
|---|---|
| C02F 1/28 | (2006.01) |
| C02F 1/32 | (2006.01) |
| C02F 1/52 | (2006.01) |
| C02F 1/66 | (2006.01) |
| C02F 1/78 | (2006.01) |
| C02F 5/02 | (2006.01) |
| C02F 11/08 | (2006.01) |
| C02F 101/00 | (2006.01) |
| C02F 101/20 | (2006.01) |
| C02F 103/10 | (2006.01) |
| C02F 1/20 | (2006.01) |
| C02F 1/72 | (2006.01) |
| C02F 101/10 | (2006.01) |

(52) U.S. Cl.
CPC ............ C02F 1/281 (2013.01); C02F 1/32 (2013.01); C02F 1/52 (2013.01); C02F 1/5236 (2013.01); C02F 1/5245 (2013.01); C02F 1/66 (2013.01); C02F 1/725 (2013.01); C02F 1/78 (2013.01); C02F 5/02 (2013.01); C02F 11/086 (2013.01); C02F 2101/006 (2013.01); C02F 2101/10 (2013.01); C02F 2101/101 (2013.01); C02F 2101/203 (2013.01); C02F 2101/206 (2013.01); C02F 2103/10 (2013.01); C02F 2201/002 (2013.01); C02F 2301/066 (2013.01); C02F 2301/08 (2013.01); C02F 2303/04 (2013.01); C02F 2303/22 (2013.01)

(56) References Cited

U.S. PATENT DOCUMENTS

| | | | | | |
|---|---|---|---|---|---|
| 4,042,501 | A | * | 8/1977 | King | C02F 1/025 210/737 |
| 4,822,497 | A | * | 4/1989 | Hong | C02F 11/086 210/177 |
| 4,898,107 | A | * | 2/1990 | Dickinson | C02F 11/086 110/238 |
| 5,384,051 | A | * | 1/1995 | McGinness | B01J 3/008 210/149 |
| 5,492,634 | A | * | 2/1996 | Hong | B01J 3/008 210/758 |
| 5,543,057 | A | * | 8/1996 | Whiting | C02F 1/025 210/721 |
| 5,567,090 | A | * | 10/1996 | Basak | B01D 46/30 406/155 |
| 5,571,423 | A | * | 11/1996 | Daman | B01J 3/008 210/761 |
| 5,571,424 | A | * | 11/1996 | Ahluwalia | C02F 11/086 210/761 |
| 5,591,415 | A | * | 1/1997 | Dassel | B01J 3/00 422/241 |
| 5,674,405 | A | * | 10/1997 | Bourhis | C02F 1/025 210/761 |
| 5,707,198 | A | * | 1/1998 | Vind | B01J 3/02 406/175 |
| 6,010,632 | A | * | 1/2000 | Ross | B32B 37/04 210/759 |
| 6,551,517 | B1 | * | 4/2003 | Sentagnes | B01J 3/008 205/755 |
| 6,582,605 | B2 | * | 6/2003 | Krulik | C02F 1/5236 210/638 |
| 6,773,581 | B2 | * | 8/2004 | Hazlebeck | B01F 7/008 15/93.1 |
| 8,915,301 | B1 | * | 12/2014 | Bader | C02F 9/00 166/279 |
| 9,206,368 | B2 | * | 12/2015 | Breneman | C10B 49/02 |
| 9,315,401 | B2 | * | 4/2016 | Felch | C02F 1/66 |
| 2002/0086150 | A1 | * | 7/2002 | Hazlebeck | C23C 28/023 428/304.4 |
| 2004/0011746 | A1 | * | 1/2004 | Joussot-Dubien | A62D 3/20 210/758 |
| 2010/0263342 | A1 | * | 10/2010 | Liu | B01D 46/30 55/474 |
| 2010/0266460 | A1 | * | 10/2010 | Liu | F23C 10/24 422/145 |
| 2011/0108491 | A1 | * | 5/2011 | Lean | C02F 1/041 210/737 |
| 2012/0100051 | A1 | * | 4/2012 | Choi | C01B 25/18 423/181 |
| 2013/0126442 | A1 | * | 5/2013 | Bakas | C02F 1/725 210/758 |

OTHER PUBLICATIONS

Armellini et al., "Experimental Methods for Studying Salt Nucleation and Growth from Supercritical Water," J. Supercritical Fluids, 1991, 4, 254-264.*

European Patent Office, International Search Report and Written Opinion issued in International Application No. PCT/US2016/030740, dated Aug. 5, 2016, 14 pages.

Samuel O. Odu et al., "Design of a Process for Supercritial Water Desalination with Zero Liquid Discharge," Industrial & Engineering Chemistry Research, vol. 54, No. 20, Apr. 22, 2015, pp. 5527-5535 (9 pages).

* cited by examiner

TECHNIQUE FOR REMOVAL OF ORGANICS AND DISSOLVED SOLIDS FROM AQUEOUS MEDIAS VIA SUPERCRITICAL TREATMENT

CROSS-REFERENCE TO RELATED APPLICATIONS

This application is a submission under 35 U.S.C. § 371 of International Application No. PCT/US2013/022842, filed Jan. 24, 2013, which claims priority to U.S. Provisional Patent Application Ser. No. 61/591,436, filed Jan. 27, 2012, the disclosures of which are hereby expressly incorporated by reference herein in their entireties.

BACKGROUND OF THE INVENTION

Management of flowback and produced (F/P) water from conventional and unconventional oil and gas wells has been deemed by the US Department of Energy as the largest volume waste stream associated with oil and gas production. With increased oil and gas production from unconventional resources F/P water management is a growing concern worldwide. In 2007, oil and gas fields produced over 80 billion barrels of water requiring processing. Global cost estimates stemming from F/P water management are more than $40 billion annually, with water transportation costs accounting for an additional $20 billion annually.

Within North America, tremendous growth in oil and gas production has been realized through the development of unconventional shale reservoirs. Two significant obstacles to continued unconventional shale development are the availability of water for drilling and hydrofracturing and management of F/P water from unconventional wells. During development of a horizontal well, 1 to 6 million gallons of fresh water may be used to stimulate the shale formation. The fracturing fluid is typically composed of approximately 90.6 wt % water, 9.0 wt % proppant, and 0.4 wt % of additives. Up to 750 chemicals have been used as additives for fracturing fluid and consist of acids, biocides, breakers, clay stabilizers, corrosion inhibitors, crosslinkers, friction reducers, gelling agents, iron control, pH control, scale inhibitors, and surfactants. After fracturing over 1 million gallons of F/P water is generated from each well which must be transported offsite for proper disposal.

F/P water contains a variety of components from both the fracturing fluid and shale formation. Table 1 presents a summary of some of the components and concentration ranges found in F/P water. The compositions of F/P water are quite different and both can vary with time and location. In general, flowback water typically contains higher hydrocarbon and chemical compositions due to its fracturing fluid content, while produced water contains higher total dissolved solids (TDS) from the shale formation. Hydrocarbons and chemicals found in F/P water are both polar and non-polar in nature, while typical dissolved solids constituents include Al, Ba, Ca, Fe, Li, Mg, Mn, Na, and Sr in the form of chlorides, carbonates, and sulfates. Additional F/P water components includes suspended solids, bacteria, and normally occurring radioactive material.

TABLE 1

| Key Flowback and Produced Water Contaminants | |
|---|---|
| Constituent | Concentration (mg/L) |
| Ba | 2,300-6,500 |
| Ca | 5,100-18,000 |
| Fe | 11-60 |
| Mg | 4440-1,300 |
| Mn | 2-5 |
| TDS | 69,000-300,000 |
| Hydrocarbon | 40-1,000 |
| TSS | 100-500 |

Conventional F/P water disposal currently used by the gas industry consists of separating F/P water from proppant and gas, followed by interim flowback water storage. The flowback water is then transported to a disposal pit, evaporation pond, or recycling facility offsite. A more attractive fluid management option is to reuse F/P water in subsequent drilling activities. However, F/P water cannot simply be reused due to its host of components which can interfere with subsequent hydrofracturing activities.

The present invention provides a cost-effective F/P water treatment process for onsite operation allowing water to remain within the field reducing water demand and need to transport F/P water offsite.

SUMMARY OF THE INVENTION

The present invention is premised on the realization that F/P water from hydraulically fractured wells can be treated for reuse by separating impurities using a combination of chemical and mechanical separation techniques. According to the present invention, the F/P water can be treated using one or more of a hydrocyclone particulate filter, an ultraviolet (UV) treatment unit, a sulfonation unit, a softening unit, a hydrolysis unit to remove targeted dissolved solids, and a radioactive material adsorption unit.

In addition to these one or more treatment units, the F/P water is introduced into a super critical reactor that heats the water to super critical temperature causing the water to exhibit non-polar behavior. This, in turn, causes the remaining dissolved solids to precipitate. These salts are collected at the bottom of the unit, and the purified water exits through the top of the unit.

In addition, any hydrocarbons present in the fluid will decompose and undergo water/gas shift reaction, forming hydrogen and carbon dioxide. The hydrogen and carbon dioxide. This gas mixture can be used, in part, along with well head gas to power super critical reactor either directly or through the use of an electrical generator.

The present invention will be further appreciated in light of the following detailed description and drawings in which:

DETAILED DESCRIPTION

Figure 1:
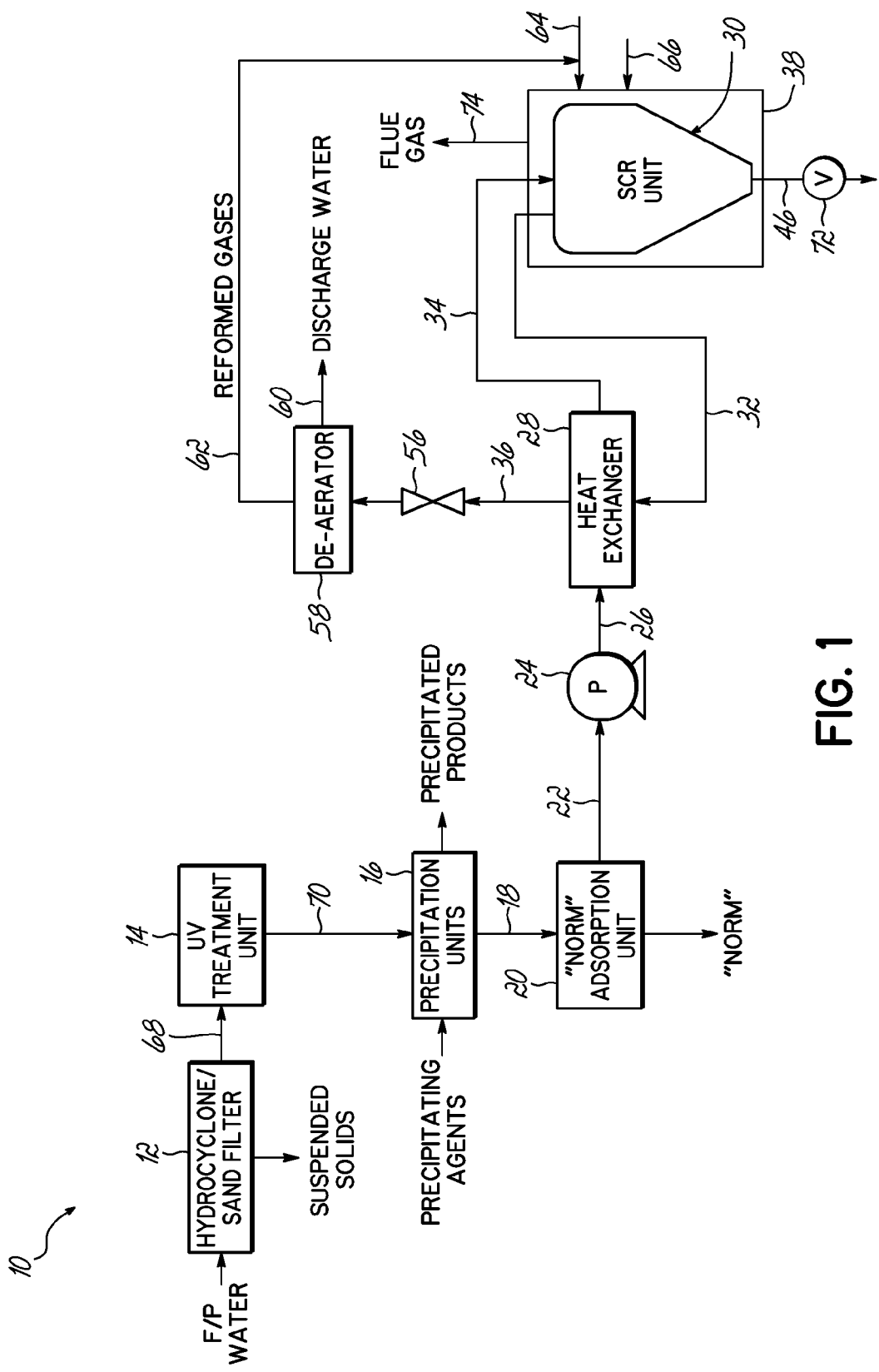
FIG. 1 is a diagrammatic depiction of the process of the present invention.

As shown in FIG. 1, the system 10 of the present invention is designed to purify flowback and produced water from an oil or gas well, referred to as F/P water or waste water. The system 10 includes preferably an initial particle separator 12 to remove suspended particles from the F/P water. This can be, for example, a hydrocyclone/sand filter. However, other types of filters can be used.

The system 10 further includes a biological treatment unit 14 designed to destroy microorganisms present in the F/P water. This can be, for example, an ultraviolet light treatment unit, an ozonator, or simply a chemical treatment unit utilizing common biocides and bacteriacides. Generally, an ultraviolet treatment unit or an ozonator are preferred as these units do not add any additional chemicals to the F/P water.

The system 10 further includes one or more separate precipitation units 16 (one shown) designed to remove various ions from the water system. The precipitation units can include, for example, a sulfonation unit to remove barium and strontium, by adding sulfuric acid, which will cause the barium and/or strontium to precipitate out of solution as sulfates. The precipitation unit can also be a separate softening unit to remove calcium and magnesium. This is accomplished simply by mixing sodium carbonate into the F/P water, which will cause the formation of calcium and/or magnesium carbonates, which will, again, precipitate out of solution. Finally, a hydrolysis unit can be used to remove iron and/or magnesium. This would be accomplished by adding hydroxide to the F/P water to produce hydroxides of the iron or manganese which, again, will precipitate out of solution. Whether any or all and any combination of these individual units are used is dependent on the ions in the water.

The precipitation units are connected via conduit 18 to a radiation adsorption unit or norm adsorption unit 20, which is designed to remove normally occurring radioactive material from the waste stream. Adsorption units are well known. These may include, for example, barium sulfate or other adsorbant to adsorb the radioactive material within the waste stream mainly Ra 226 and Ra 228. The adsorption unit 20 can also be located upstream of the precipitation units 16 or downstream of the heat exchanger 28.

The radioactive material adsorption unit 20 is connected via conduit 22 to a high pressure pump 24, which is connected via line 26 to a heat exchanger 28, which takes fluid emitted from the super critical reactor 30 through line 32 to pre-heat the water passing through line 26 and subsequently line 34 into the super critical reactor 30. The water emitted from the super critical reactor 30 through line 32 in turn passes through the heat exchanger and through output line 36, as discussed hereinafter.

Figure 2:
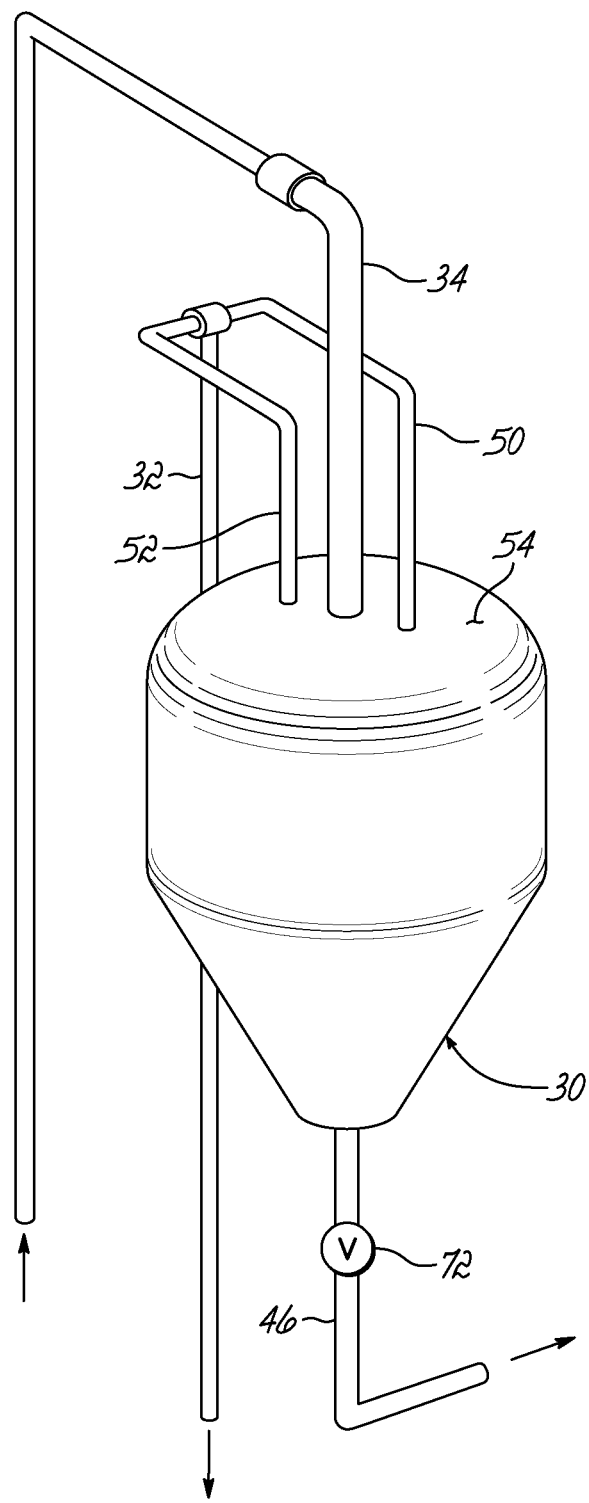
FIG. 2 is a perspective view of the super critical reactor outside of the furnace.
Figure 3:
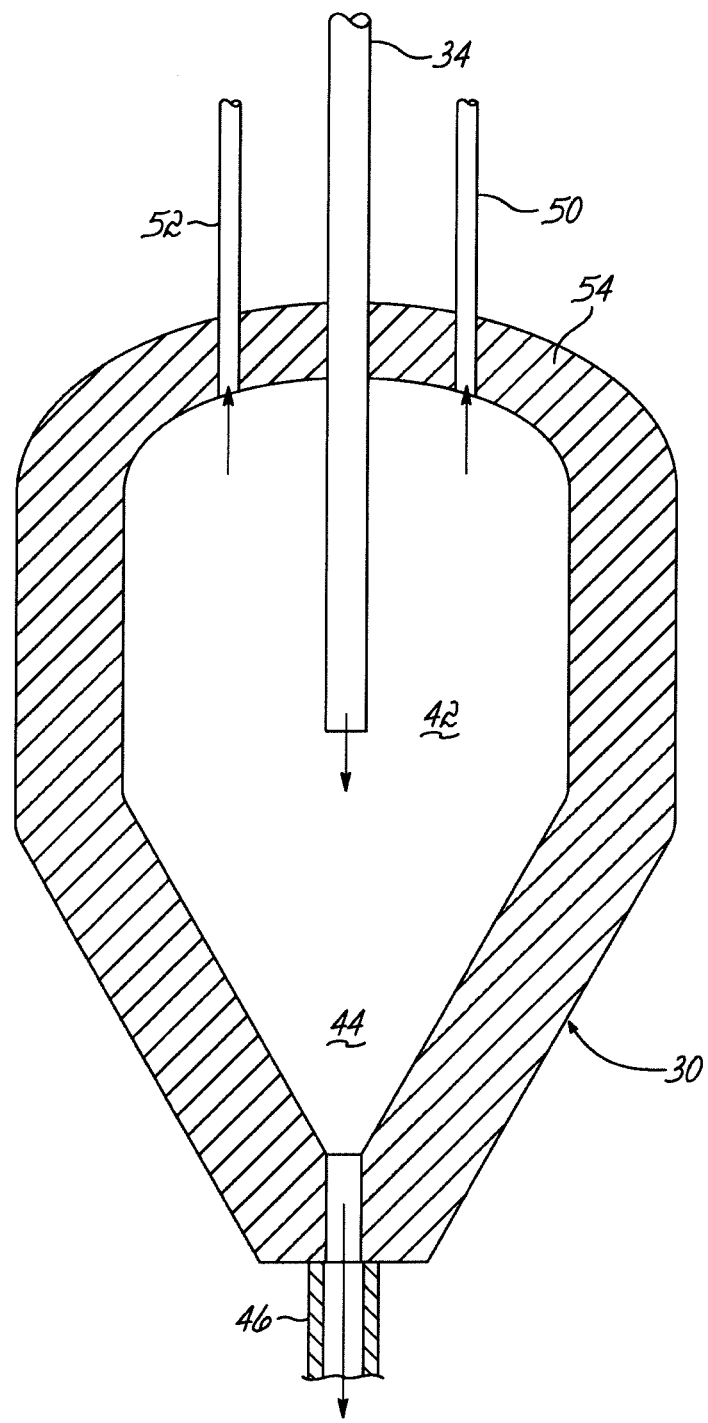
FIG. 3 is a cross sectional view of the super critical reactor shown in FIG. 2.

With reference to FIGS. 2 and 3, the super critical reactor 30 is simply a high-pressure vessel adapted to receive the waste water and maintain this under super critical conditions. Although shown only diagrammatically in FIG. 1, the super critical reactor 30 is encased within a furnace 38, which is effective to establish the desired temperature. The pre-heated water is introduced through inlet conduit 34 into reactor 30. As can be seen, the inlet 34 extends to a middle portion 42 of the reactor 30. The reactor itself has a inverted cone-shaped bottom portion 44 and a solids outlet 46.

The reactor is made from any material that can safely maintain the physical conditions within the reactor. In addition, the inner walls of the reactor may be coated with a ceramic film or high temperature resistant silicone coating to help prevent solids deposition. Furthermore the inner walls of the reactor may be etched to produce a surface which inhibits solids deposition. Outlets 50 and 52 extend through either side of the top wall 54 of reactor 30 and are combined at conduit 32 which leads to the heat exchanger 28. Additional outlets may also be used. The fluid emitted from the super critical reactor 30 then goes through the heat exchanger 28 where the temperature is reduced below super critical conditions and passes through line 36 through a pressure regulator valve 56 and into a de-aerator 58. The de-aerator simply separates reformed gases from water. The water, in turn, is discharged from line 60 and the re-formed gases are emitted from the de-aerator through 62 and are combined with an inlet line 64 and introduced into the furnace 38, which surrounds the super critical reactor 30. Air is also introduced into the furnace through line 66 to provide combustion gases, and thereby heat.

In operation, the flowback and produced water from the fractured well, which can be in a storage tank (not shown) is introduced into the particulate separator 12. This simply provides a physical removal of suspended solids generally down to a particle size of about 0.1-10 micron. The water then passes through line 68 into the biological treatment unit 14. Ultraviolet and ozone-based treatment units are well known, and form no part of the present invention. This will either kill or sterilize bacteria and other microorganisms, which prevents fouling of the downstream components.

The waste water, after passing through the biological treatment unit 14 then is introduced through line 70 through a series of precipitation units 16. As indicated, based on the contents of the waste water, the particular precipitation units utilized may vary. If barium or strontium are present, they are removed by addition of sulfuric acid in a precipitation unit, which would cause the formation of barium sulfate and/or strontium sulfate. Generally, an amount of sulfuric acid up to about 1000 mmol/L is added to cause Ba and Sr to precipitate. The barium sulfate can be collected and used as an adsorbant in the radiation adsorption unit, if desired. It is best to remove barium before hydrolysis because $Ba(OH)_2$ that would then form in the hydrolysis unit is toxic. Some strontium may remain in solution due to the presence of chloride ions.

If calcium or magnesium is present, a softening unit can be utilized to cause the calcium and/or magnesium to precipitate. This can be accomplished by the addition of sodium carbonate. Basically, it is desirable to add up to about 800 mmol/L sodium carbonate in the precipitation unit.

Finally, if there is iron or manganese present, then ions can be removed by adding sufficient sodium hydroxide to establish a basic pH, causing the iron and manganese to precipitate out of solution. The hydrolysis treatment also removes remaining carbonates because they precipitate with pH increase, which reduces downstream scale formation. The added hydroxide also inhibits corrosion in the super critical reactor.

The water from the precipitation unit then passes through line 18 into the radioactive material absorption unit 20. Such adsorption units are well known and form no part of the present invention. The adsorption method can be replaced by the widely used NaEZ separation method, but such a separation process would have to be at the end of the system 10.

The water from the radioactive material adsorption unit 20 passes through line 22 to the feed pump 24. This increases the waste water pressure to at least about 3,200 psia, and up to 3,480 psia, and generally 3,250 psia. After pressurization, the waste water flows though line 26 into the heat exchanger 28, which transfers thermal energy from the super critical reactor effluent introduced through line 32 to the water introduced through line 26. Generally, the temperature of the water leaving the heat exchanger through line 34 will be about 360° C., generally 390° C., and, in particular 380° C. This is below the super critical temperature of water.

The water from pump 24 is then introduced into the center of the super critical reactor 30, which is heated with combusted well head gas and air introduced through line 64 and 66, respectively. This will heat the center of the super critical reactor to above the super critical temperature of the waste water, which is generally at least about 410° C. As the water reaches the super critical temperature at the center of the reactor 30 the remaining dissolved salts will precipitate out of solution due to the changing nature of the super critical fluid. When the water reaches super critical state, its density dramatically decreases and the hydrogen bonding is significantly reduced, making the water behave as a non-polar liquid. Thus, the ionic salts remaining in the water are no longer soluble and precipitate out of solution in the central portion of the reactor 30. These precipitated solids then fall to the bottom portion of the reactor. These solids can then be periodically removed by opening valve 72, bleeding off the accumulated solids. By establishing the super critical temperature at the center of the reactor, little or no scale forms on the reactor wall.

The super critical fluid then flows through lines 50 and 52, exiting through the top wall 54 of the reactor 30, and then pass through line 32 to the heat exchanger, where the temperature will be reduced to below super critical conditions.

At the same time the dissolved ionic salts are precipitating, any hydrocarbon present in the waste water, as well as other organic material, will undergo a water/gas shift reaction in which the hydrocarbons react with steam to form hydrogen and carbon monoxide and, subsequently, again react with steam to form hydrogen and carbon dioxide. This gaseous mixture is contained within the effluent passing through line 32. To promote re-forming of aromatic hydrocarbons, the reactor can include a low-cost reforming catalyst and a mild oxidizing agent. The catalyst and oxidizing agent are used to promote initial carbon bonding destruction, allowing super critical water to then reform the remaining hydrocarbons. The catalyst can be, for example, a heterogenous nickel-base catalyst on a solid support (not shown) within the reactor 30. The oxidizing agent can be air, peroxides, perchlorates, ozone, and permanganates, as well as others.

The effluent passes through line 36 through valve 56 to de-aerator 58, which separates the gas from the water. The water passes through line 60. This water can then be reused in the fracturing process or can be discharged into the environment or into a waste water disposal system. The gases are directed through line 62 and back to line 64 where they mix with the well head gases used as a fuel for the furnace 38. The combustible gas combined with the air can be used to heat the super critical reactor. The combustion products then exit the furnace 38 through line 74.

A series of tests using a bench-scale reactor were conducted to demonstrate the ability of the present system to remove dissolved solids and hydrocarbons from water under super critical conditions using a heterogeneous Ni-based catalyst. The tests evaluated the ability of the super critical reactor to precipitate highly soluble monovalent and divalent salts (NaCl and $CaCl_2$) and reform benzene, methanol, ethanol, and GROs. Model F/P solutions and products were analyzed using GC/MS and ICP-MS. Operating conditions were 410° C., 3,250 psig, and a flow rate of 15 mL/min of modeled F/P water. Results from the super critical water tests are presented in Table 3.

TABLE 3

Super critical Water Evaluation Results

| Constituent | Inlet Concentration [mg/L] | Outlet Concentration [mg/L] |
| --- | --- | --- |
| NaCl | 150,000 | 127 |
| $CaCl_2$ | 3,000 | 112 |
| Benzene | 5 | >0.08 |
| Methanol | 5 | >0.05 |
| Ethanol | 5 | >0.05 |
| GROs | 10 | >0.06 |

The super critical water conditions were able to remove dissolved solids through precipitation and reform both polar and non-polar hydrocarbons to concentrations below 1 mg/L. Results from the bench-scale tests clearly demonstrate the ability to remove F/P water constituents using super critical water.

Thus the process of the present invention reduces operating costs by reducing water supply disposal and transportation expenses, and recovers 95% of the waste water as a reusable water product. The process removes all major waste constituents, allowing the water to be discharged to a local environment, and eliminates the need for water disposal trucks. Further, the separated waste products obtained can be used. For example, the barium sulfate can be used in the norm adsorption unit. The salts obtained from the super critical reactor can be applied to roads as road salt. There are commercial uses for the calcium carbonate, barium carbonate, strontium carbonate, calcium hydroxide, magnesium hydroxide, and iron hydroxide. Thus, none of these byproducts need to end up in a land fill.

This has been a description of the present invention along with the preferred method of practicing the present invention. However, the invention itself should only be defined by the appended claims.

Wherein I claim:

1. A method of removing dissolved solids from water in a reactor having a top wall, a bottom wall and a side wall, the method comprising:
   introducing water into a central portion of said reactor separate from said walls and bringing said water to super critical condition in said central portion of said reactor whereby dissolved solids in said water precipitate in said central portion of said reactor and fall to a bottom portion of said reactor without dissolving or being suspended in a liquid in said bottom portion of said reactor, and
   removing the precipitated solids from said bottom portion of said reactor, and
   removing the water in super critical condition from an upper portion of said reactor,
   wherein said water is derived from one of an oil well and a gas well.

2. The method claimed in claim 1 wherein said water is treated upstream of said reactor with at least one of the following
   1) the addition of sulfuric acid to remove barium sulfate;
   2) the addition of sodium carbonate to remove calcium and magnesium; and
   3) the addition of a base to remove iron and manganese.

3. The method claimed in claim 2 wherein said water is treated upstream of said reactor with a biocide.

4. The method claimed in claim 2 wherein said water is filtered upstream of said reactor.

5. The method claimed in claim 2 wherein said water is treated to remove radioactive material upstream of said reactor.

6. The method claimed in claim 1 wherein said reactor further produces hydrogen and wherein said hydrogen is separated from said water and is used to heat said reactor.

7. The method claimed in claim 1 wherein said reactor is heated with well gas.

8. A method of treating water generated from hydraulic fracturing, the method comprising:
receiving water from one of an oil well and a gas well;
physically removing suspended solids from said water;
precipitating out one or more cations from said water;
increasing the pH of said water to remove manganese and iron; and
subjecting said water to super critical pressure in a central portion of a reactor causing impurities in said additional water to precipitate out in the central portion of said reactor and removing said precipitated impurities from said reactor.

9. A super critical reactor having reactor walls adapted to withstand super critical conditions of water;
said reactor having an inlet conduit extending into a center portion of said reactor at which water is heated to super critical condition, said center portion being spaced inwardly from said reactor walls;
at least one fluid outlet arranged at an upper portion of said reactor that is in fluid communication with said center portion of said reactor; and
a tapered bottom portion having a solids outlet leading to a solids outlet valve, wherein said inlet conduit is arranged above and extends coaxially with said tapered bottom portion and said solids outlet.

10. The reactor claimed in claim 9 wherein said reactor walls have an inner surface adapted to inhibit scale formation.

11. The reactor claimed in claim 10 wherein said inner surface is ceramic.

12. The reactor claimed in claim 9 wherein said at least one fluid outlet includes first and second fluid outlets.

* * * * *